(12) United States Patent
Speicher et al.

(10) Patent No.: US 6,216,075 B1
(45) Date of Patent: Apr. 10, 2001

(54) PROCESS FOR DETERMINING THE OPERATING POINT OF A CONTINUOUSLY VARIABLE TRANSMISSION

(75) Inventors: Patrick Speicher, Oberteuringen; Ralf Vorndran, Eriskirch; Wolfgang Danz, Friedrichshafen; Udo Gillich, Meckenbeuren, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/230,404
(22) PCT Filed: Jul. 25, 1997
(86) PCT No.: PCT/EP97/04046
§ 371 Date: Jan. 25, 1999
§ 102(e) Date: Jan. 25, 1999
(87) PCT Pub. No.: WO98/05886
PCT Pub. Date: Feb. 12, 1998

(30) Foreign Application Priority Data

Aug. 1, 1996 (DE) ............................................. 196 31 070

(51) Int. Cl.$^7$ ..................................................... G06F 7/00
(52) U.S. Cl. .............................. 701/51; 701/58; 701/60; 477/37; 477/43; 477/44; 477/49
(58) Field of Search .................................. 701/51, 58, 62, 701/66; 474/28, 70, 18, 29; 477/45, 48, 46, 47, 43, 904, 905, 39, 40, 37, 42, 49

(56) References Cited

U.S. PATENT DOCUMENTS

| | | | |
|---|---|---|---|
| 4,653,006 | * 3/1987 | Osanai et al. ........................... | 701/60 |
| 5,009,129 | * 4/1991 | Morimoto et al. ...................... | 477/49 |
| 5,012,697 | 5/1991 | Yamashita et al. ..................... | 477/43 |
| 5,161,433 | 11/1992 | Sakakibara et al. .................... | 477/43 |
| 5,413,540 | * 5/1995 | Streib et al. ............................. | 477/43 |
| 5,545,106 | * 8/1996 | Senger et al. ........................... | 477/43 |
| 5,557,521 | * 9/1996 | Danz et al. ............................. | 701/57 |
| 5,609,068 | * 3/1997 | Gruhle et al. ....................... | 74/336 R |
| 5,795,261 | * 8/1998 | Speicher et al. ........................ | 477/48 |
| 5,911,770 | * 6/1999 | Danz et al. ............................. | 701/57 |
| 5,919,244 | * 7/1999 | Danz et al. ............................. | 701/57 |
| 5,961,408 | * 10/1999 | Konig et al. ............................ | 474/18 |
| 5,967,918 | * 10/1999 | Knapp et al. ........................... | 474/28 |

FOREIGN PATENT DOCUMENTS

| | | |
|---|---|---|
| 34 15 596 C2 | 10/1984 | (DE) . |
| 41 20 546 A1 | 12/1992 | (DE) . |
| 42 23 967 A1 | 1/1994 | (DE) . |
| 43 12 415 A1 | 10/1994 | (DE) . |
| 44 45 325 A1 | 6/1995 | (DE) . |
| 195 13 629 A1 | 10/1995 | (DE) . |
| 44 28 684 A1 | 2/1996 | (DE) . |
| 44 32 678 A1 | 3/1996 | (DE) . |
| 196 00 915 A1 | 7/1997 | (DE) . |
| 0 364 270 A1 | 4/1990 | (EP) . |
| 0 657 668 A1 | 6/1995 | (EP) . |

* cited by examiner

Primary Examiner—Jacques H. Louis-Jacques
(74) Attorney, Agent, or Firm—Davis & Bujold, P.L.L.C.

(57) ABSTRACT

In the process according to the invention for predetermining the ratio of a continuously variable transmission (5), a dynamic driving range is generated. The actual, minimum and maximum acceleration (a_akt, a_min, a_max) is calculated. Further detected is the driver's wish to accelerate or to decelerate (a_fwu) and an acceleration (a_vorg) is determined. Also calculated is a change of ratio per time unit of the continuously variable transmission (iV_pkt), which is guided by the engine speed of rotation during adjustment of the continuously variable transmission (5).

10 Claims, 2 Drawing Sheets

PROCESS FOR DETERMINING THE OPERATING POINT OF A CONTINUOUSLY VARIABLE TRANSMISSION

BACKGROUND OF THE INVENTION

The invention concerns a process for determining the operating point of an automatic transmission, particularly a continuously variable transmission, having means for detecting input signals which are drawn from a driver-vehicle system and are processed to at least one output signal by which, within the scope of an operating strategy, determined is the reduction ration and/or the speed of rotation of a prime mover and/or the vehicle acceleration or the like.

In the requirement profile of a driving strategy for a continuously variable transmission, the points of concern are a good driveability, a favorable consumption and an application effort acceptable in the practice. In the conversion of a driving strategy the resource requirement must be low. The driving strategy must automatically adapt to different driving situations (driver, vehicle and environment). The system must insensitively react in case of errors common in the practice, that is, it must have a certain sturdiness.

In the solution proposed in DE-A43 12415, characteristic lines are combined to form a switch characteristic field in which a limit line corresponds to a characteristic line of an optimized consumption and one other limit line to a characteristic line of optimized performance. The operating points between said limit lines lie on so-called dynamic characteristic lines, the position of which depends on the variable of the change of speed of the required performance.

In EP-A 0 657 668 two speed-dependent power limit curves are plotted as characteristic lines in the P-v diagram. With said characteristic lines associated are a minimum and a maximum evaluation number. The actual engine power is determined and compared with the two limit curves. By the comparison received are the actual evaluation numbers that are filtered. With the aid of the filtered evaluation number there determined are two-dimensional characteristic lines of three-dimensional characteristic line fields for control of the input unit.

The known process is, in partial aspects, advantageous for driving a strategy, since the actual evaluation number can be found by simple interpolation. The control of the time characteristic, via an adequate filter, must require no great effort. But, on the other hand, it remains open in the know process how other, no less important partial aspects of the requirement profile, can be taken into account.

To reduce the development time, it is proposed in the device for control of a continuously variable transmission according to DE-A 44 45 325 to evaluate the engine torque in order to calculate an input torque of the transmission. By comparing the calculated input torque of the transmission with a theoretical input shaft torque, which is based on the parameters informed of the engine load, a theoretical reduction ratio is determined. From performance graphs of theoretical input shaft torque deduced is a theoretical reduction ratio which is compared with the actual reduction ratio of the continuously variable transmission. From the difference, a controlled output is drawn in order to equate the actual reduction ratio with the theoretical reduction ratio. This solution, however, also requires several performance graphs in order to take into account an actual mode of driving.

In the device of DE-A 42 23 967 a transmission output torque is set within the scope of a predetermined operation strategy. The presettable operation strategy represents a sporting or consumption-favorable driving characteristic. A performance graph, particularly with points of support, is determined by consumption measurements. The theoretical value of the transmission ratio is selected as low as possible depending on a minimum speed of rotation of the engine and a desired output torque.

The continuously variable transmission reacts in special situations with an uneven acceleration characteristic. The subjective driveability can be objectively made clear by the following characteristic: upon a leap-like change of the throttle valve position, the theoretical speed of rotation value of the prime mover jumps vertically. Contrary to this significant increase of the engine speed of rotation, the vehicle speed remains at first constant for a certain period of time. Consequently, it is mainly disadvantageous that the driver at first notices no acceleration of the vehicle. Under unfavorable circumstances, a brief deceleration of the vehicle can occur. The driver seeks to overcome said situation by reporting a still greater need of power. The consequence of this is an over control of the throttle valve.

The problem on which this invention is based is to provide a process for determining the operating point of a continuously variable transmission which guided itself by superimposed variables, such as driver's wish, mode of driving and driving state.

SUMMARY OF THE INVENTION

This problem is solved by a process having the features of the present invention.

The advantages achievable with the invention consist especially in that the requirement profile on a driving strategy for a continuously variable transmission is taken into account to a particularly great extent. The determination of the operating point is limited to a driving range of variable limits. The theoretical acceleration values are calculated taking into account said limits. Taking into account the driver's wish, an acceleration is preset which makes possible a calculation of the variable speed and of the ratio. Here the curve of the engine speed of rotation is controlled so as to create a dependence between the engine speed of rotation and the speed of rotation of the secondary pulley of the continuously variable transmission. In an especially advantageous manner, the engine speed is guided during a change of ratio so to prevent an undesired lowering or rising of the engine speed of rotation—without any relation to the pulley speed of rotation of the output. If necessary, a curve for the engine speed of rotation can be preset. Besides, a limitation of the maximum variable speed is advantageous in some cases.

BRIEF DESCRIPTION OF THE DRAWING(S)

Other features essential to the invention and the advantages resulting therefrom are to be understood from the description of an embodiment that follows with reference to the drawings. In the drawings.

DESCRIPTION OF THE PREFERRED EMBODIMENT(S)

Figure 1:
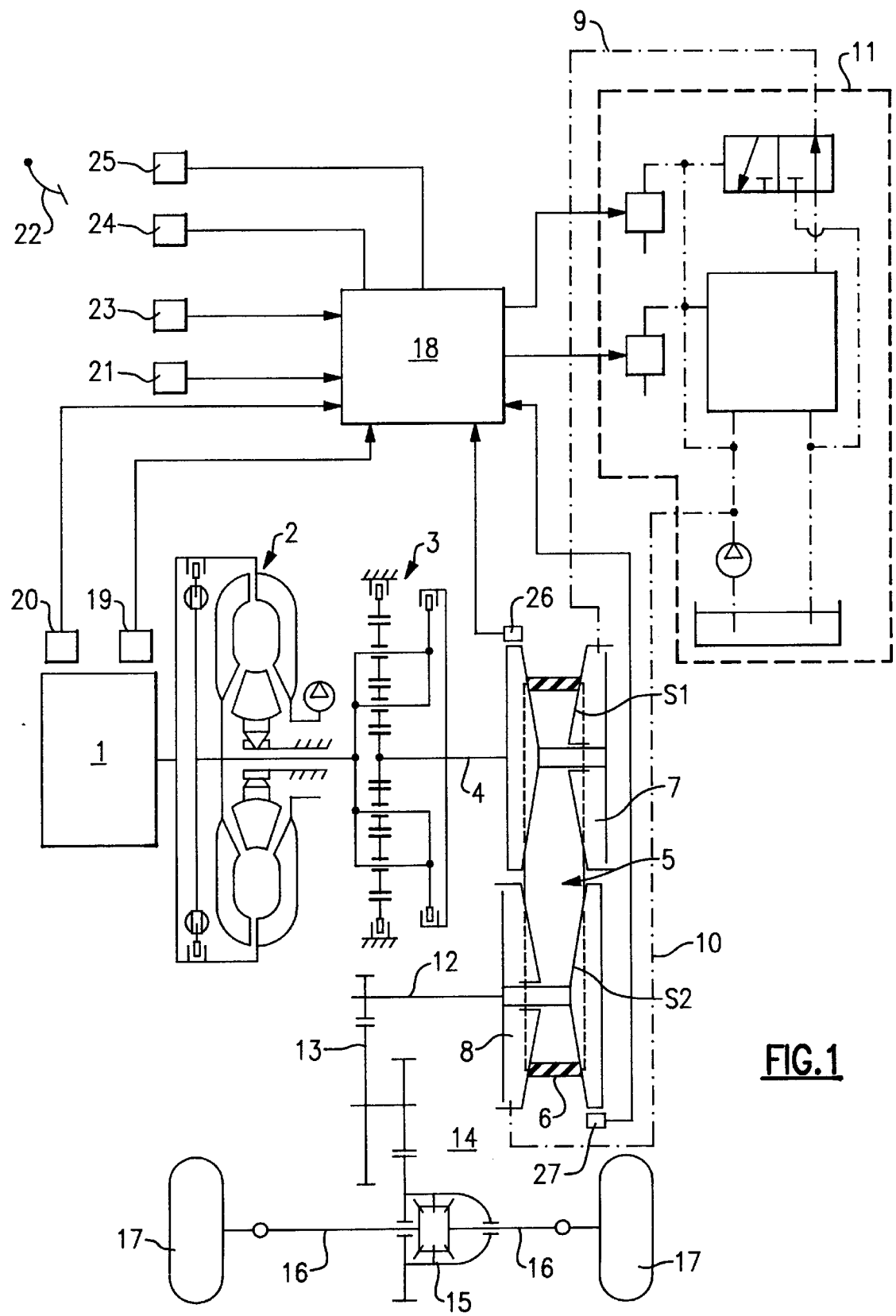
FIG. 1 is a diagram of continuously variable transmission within a vehicle.

FIG. 1 diagrammatically shows a continuously variable transmission: an input unit 1, preferably an internal combustion engine, drives a start-up unit, preferably a hydrodynamic torque converter 2. Connected downstream of the hydrodynamic torque converter 2 is a reversing set in the form of a planetary gear 3. With the latter can be switched the driving directions forward and reverse by adequate switching components (clutch and brake).

An output shaft 4 drives a continuously variable transmission 5 (variator). The continuously variable transmission essentially consists of a primary pulley S1 and a secondary pulley S2 which are formed by tapered pulleys disposed in pairs and lodge between them a belt drive member 6. A primary cylinder 7 and a secondary cylinder 8 are attached to the hydraulic control 11, via hydraulic lines 9 and 10.

An output shaft 12 drives, via gear pairs 13 and 14 and a differential 15, the axle half shafts 16 of the driven wheels 17 of a vehicle (not shown itself.

The continuously variable transmission 5 is controlled by an electronic transmission control 18. The function of the transmission control is to adjust the ratio according to a preset operating strategy. To this end, it is required to process a plurality of operating parameters. One sensor 19, for example, detects the input variables: actual throttle valve position _DK). The actual engine speed of rotation n_Mot is detected by a sensor 20. A sensor 21 detects the position of a control member 22 with which the driver of the vehicle reports a need of power. A sensor 23 signals a manual driver contact.

The enumeration of the possible operating parameters (input variables) is not complete. To said variables can belong, for example, the temperature of the hydraulic fluid. This is detected by means of temperature sensor 24. For certain driving situations other parameters have to be processed. To detect cornering, it is convenient to evaluate the transverse acceleration and/or differences of wheel speeds of rotation. This is done with one other sensor 25.

By means of a speed of rotation, sensor 26 monitors the speed of rotation n_S1 of the primary pulley. One other sensor 27 delivers the speed of rotation n_S2 of the second pulley. The input variables are processed by the electronic transmission control to output variables having different functions (information for indicating the system states, control signals for actuators, etc.). A few of the output variables act as input variables for the hydraulic control 11, in order to trigger the actuation of electromagnetic valves.

Figure 2:
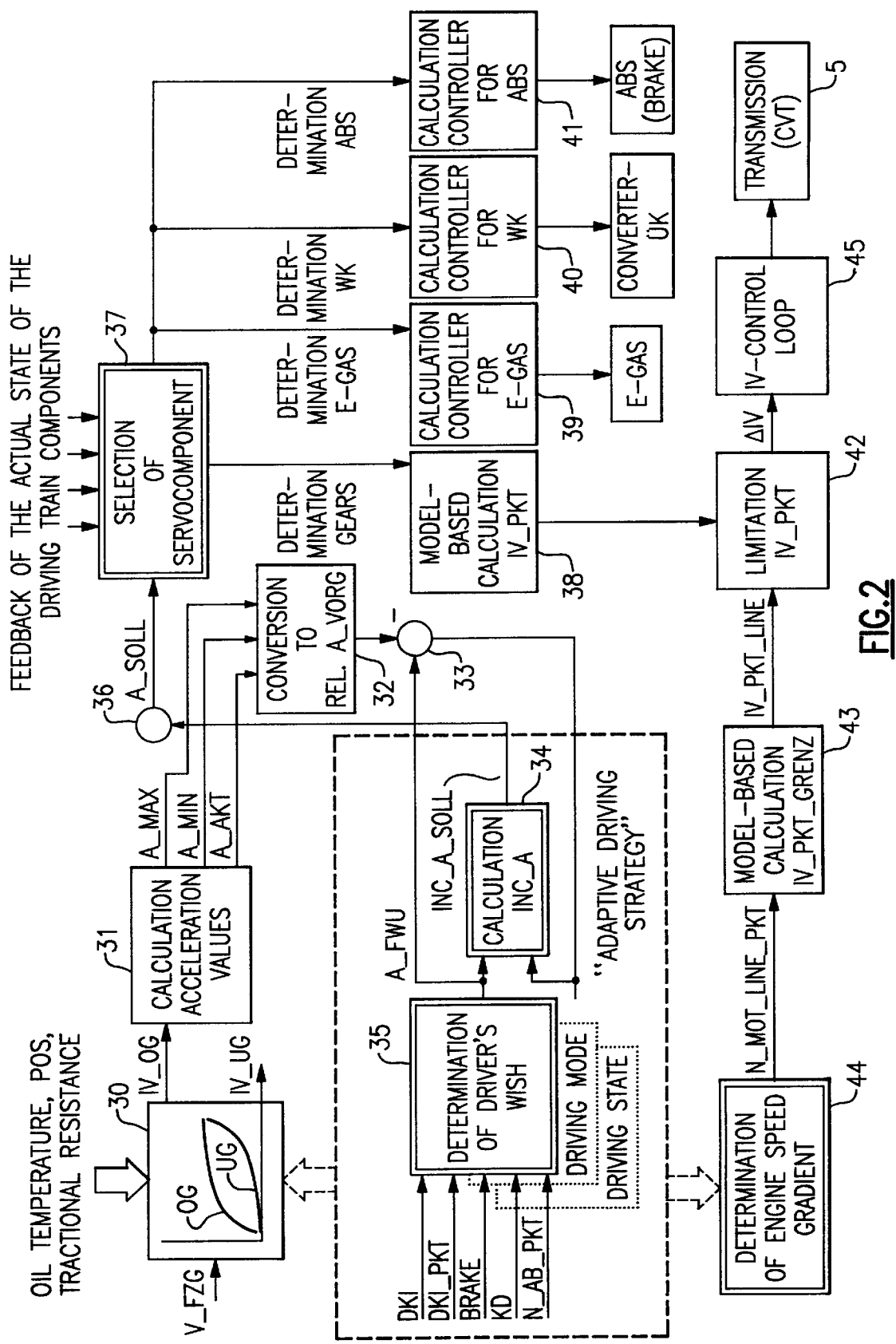
FIG. 2 is a block gearshift pattern of a control loop for regulating the ratio of a continuously variable transmission according to FIG. 1.

The operation strategy used to adjust the continuously variable transmission is explained with reference to FIG. 2 which reproduces a signal flow chart of a regulation for the drive train.

In a first function block 30, a driving range is generated which is delimited by a lower characteristic line UG and an upper characteristic line OG. The UG and OG characteristic lines are generated by value pairs of the ratio iV, or of the speed of rotation of the primary pulley n_S1, or of the vehicle acceleration and of the vehicle speed vF. Instead of the parameters mentioned, equivalent variables can be set. The possible operating point standards are given by the driving range. An actual operating point standard B_akt is in the preset driving range. Its position or change in a vertical direction is determined essentially by the operating strategy while the measure of the horizontal displacement results from the vehicle speed vF. The diagrammatically plotted driving range is preferably changeable. It can be varied by moving the UG and OG characteristic lines which constitute the actual range limits. A preferred process for determining an operating point in a dynamic driving range is explained in the Applicant's German patent application 196 00 915 of Jan. 12, 1996. To that extent, reference will supplementarily be made to the contents thereof.

The explanation of the operating strategy that follows, according to the invention, let it be anticipated that in the change of the reduction ratio of the continuously variable transmission there take part:

a) a torque balance on the transmission output shaft or on the driven wheels;

b) a consideration or calculation of accelerations departing from an actual operating point B_akt, specifically: the actual acceleration a_akt, the minimum and maximum accelerations a_min and a_max, respectively, departing from the actual engine torque M_mot and the tractional resistance torque in the actual operating point B_akt and based on the lower limit line UG and the upper limit line OG of the dynamic driving range;

c) the consideration of the driver's wish, that is, in particular the wish to accelerate or decelerate;

d) an adjustment of the ratio iV with a variable gradient which is guided by preset limit values of the engine speed of rotation during the adjustment and optionally a limitation of a maximum variable speed per time unit iV_pkt and e) an adjustment of the E-gas and an adjustment of the torque converter clutch.

Acceleration:

The lowest or highest possible acceleration a_min or a_max, respectively, is calculated by the torque balance on the wheels 17. The actual acceleration a_akt is additionally measured or evaluated. The values of said accelerations are generated within a function block 31.

The acceleration, based on the secondary pulley S2, can be expressed as change of the angular speed per time unit of the secondary pulley: $d\omega\_S2/dt$. Thus, the values result according to the following equations:

$$\frac{d\omega\_S2}{dt} = \frac{a\_0}{min\, iv\_min}M\_mot - \frac{a\_1}{iv\_min}\omega^2\_S1\_min +$$

$$\frac{a\_2-1}{iv\_min}\frac{\omega\_S1}{iv\_min}\frac{div}{dt} - M\_y - a\_4M\_Brems$$

$$\frac{d\omega\_S2}{dt} = \frac{a\_0}{max\, iv\_max}M\_mot - \frac{a\_1}{iv\_max}\omega^2\_S1\_max +$$

$$\frac{a\_2-1}{iv\_max}\frac{\omega\_S1}{iv\_max}\frac{div}{dt} - M\_y - a\_4M\_Brems$$

$$\frac{d\omega\_S2}{dt} = \frac{a\_0}{akt\, iv}M\_mot - \frac{a\_1}{iv}\omega^2\_S1 +$$

$$\frac{a\_2-1}{iv}\frac{\omega\_S1}{iv}\frac{div}{dt} - M\_y - a\_4M\_Brems$$

The expression M_y stands for the torque when passing over inclinations while the expression M_Brems means the brake torque. The determination of M_y or M_Brems is possible as an estimated value wherefore the value given by the expression $d\omega\_S2: dt$ is not exact but tendential. Moreover, the equations apply only to a torque converter in the closed state.

The acceleration values a_max, a_min and a_akt are converted in a conversion step 32 to normalized values, preferably in percents.

Let it be assumed that the vehicle (to simplify the application) moves in the stationary operation. The operating point must be moved to a (new) actual operating point B_akt. B_akt then lies in the intersection point of an actual tractional resistance characteristic line F_wid_akt with the engine torque characteristic line $M_{13}$ Mot akt. To reach the new operating point from an old (B_akt), an acceleration adapted to the actual operating situation is required. Based on the lower limit UG an acceleration a_min is possible.

Based on the upper limit OG, a value of a_max results. The driver's determination is converted in an acceleration wish within the limit values. Let this acceleration value, drawn from the driver's wish, be designated with a_fwu (acceleration based on the driver's wish).

Departing from the actual acceleration, the function of the strategy consists of equating the amount of the difference in the acceleration wished by the driver.

In the conversion step 32, the actual acceleration is set in the UG and OG limits and thus related to the values a_min and a_max. At the output, a signal is delivered which corresponds to the normalized acceleration standard a_vorg (in percent). From this and the value which corresponds in percent to the normalized driver's wish, the difference (subtraction point 33) is formed and superimposed on a function block 34.

The acceleration or deceleration which corresponds to the driver's wish a_fwu in percent, also acts as an input signal on the function block 34. Said variable is detected in a function block 35. Thereon lie input variables which represents an acceleration or deceleration. In particular, this is the actual throttle valve position _DK_pkt, the change of the throttle valve position per time unit, the throttle valve gradient _Dki, a braking signal, the signal KD for kickdown and, optionally, other signals. To said signals belongs mainly the change of the output speed of rotation (speed of rotation of the output shaft 12 or the wheel speeds of rotation). Said signal is designated with n_ab_pkt.

Formed with the function block 34 are increments, which when summed up, lead to a theoretical acceleration a_soll. Said increments are designated with inc_a_soll and as output variables of the function block 34 are fed to a summation station 36. The sum forms the already mentioned acceleration standard a_soll. a_max is selected as a standard determination (economic) and is the base for the changes of acceleration initiated by the driver or the environment.

With the acceleration standard a_soll as an input variable at least one actuator is selected in a function block 37. Said function block 37 performs, so to speak, the "head work" and assigns the acceleration standard a_soll to a theoretical standard for the transmission and/or a theoretical standard for the E-gas and/or a theoretical standard for the torque converter lock-up clutch and/or a theoretical standard for the ABS. This presupposes that on the function block 37 act, as input signals, the reverse signals to the actual state of the corresponding drive train components. Only thus, can the assignment sought be effected.

The above mentioned theoretical standards are superimposed on other function blocks.

In the function block 38 figured out is a model-based calculation of the variable speed for the ratio of the continuously variable transmission within a preset time unit. Said variable is designated iV_pkt. The objective is to guide the variable speed for the ratio per time unit in a manner such that in an acceleration or deceleration the engine speed of rotation n_Mot if guided according to the actual speed of rotation of the secondary pulley n_S2. In a positive acceleration wish only a certain curve of the engine speed of rotation is admissible out of subjective driving impression (comfort). The engine speed of rotation is guided substantially in a form such that the driver in any case notices a positive feeling of acceleration.

In the function block 39 calculated is the controller output for the E-gas. In the function blocks 40 and 41 calculated are the controller output for the converter clutch and for the ABS (brake actuation).

The iV_pkt variable generated in the function block 38 is superimposed on a limit step 42. In said limit step 42, a limit speed of the ratio of adjustment per time unit designated with iV_pk_grenz is compared with that which is generated by a function block 43. Here said variable is model-based calculated according to a preset (limit) speed of rotation gradient of the engine which is designated with n_Mot_grenz_pkt. Said variable, in turn, is delivered by a function block 44.

The inclusion of a limit gradient of the speed of rotation of the engine opens additional possibilities for the operating strategy, for example, when starting with small load and economic operating mode. To provide the power reserve needed for starting, an initial superelevation of the engine speed of rotation is required. During the transition that follows to the generally lower (economic) operating point, the corresponding negative gradient of the engine speed of rotation is limited to an extent accepted by the driver.

The continuously variable transmission is adjusted to a new theoretical value of the ratio iV_soll in a (new) actual operating point B_akt depending on the driver's wish determined between two limit values of a dynamic driving range and taking into account a curve of the engine speed of rotation which is guided by the curve of the speed of rotation of the secondary pulley and by the actual driving state or the actual driving situation with inclusion of the E-gas, the control of the torque converter lock-up clutch and the ABS or braking wish.

The controller output Δ_iV is issued to a control loop—function block 45—which assumes the adjustment of the continuously variable transmission 5.

REFERENCE NUMERALS

1 input unit
2 torque converter
3 planetary gear
4 output shaft
5 continuous transmission
6 belt drive member
7 primary cylinder
8 secondary cylinder
9, 10 hydraulic lines
11 hydraulic control
12 output shaft
13,14 gear pairs
15 differential
16 axle half shaft
17 driven wheels
18 transmission control
19 sensors
20 sensors
21 sensors
22 control member
23 sensor
24 temperature sensor
25 sensor
26 speed of rotation sensor
27 sensor
30 function block
31 function block
32 calculation step
33 subtraction point
24 function block
35 function block
36 summation point
37 function blocks
38 function blocks 39 function blocks
40 function blocks
41 function blocks
42 limitation step
43 function blocks
44 function blocks
45 function blocks What is clamed is:

1. A process for determining an operating point of an automatic transmission, especially a continuously variable transmission having a primary pulley and a secondary pulley, the continuously variable transmission having means for detecting input signals which are drawn from a driver vehicle system and are processed at least to one output signal by which is produced within the scope of an operating strategy at least one selected from the group consisting of: a standard of the reduction ratio, a standard of the speed of rotation of an engine, and a standard of a vehicle acceleration, said process comprising the steps of:

generating a driving range having a lower and an upper limit (UG, OG);

changing an actual operating point standard (B_akt), by calculating an actual acceleration (a_akt), a minimum theoretical acceleration (a_min) having a highest and lowest value, and a maximum theoretical acceleration (a_max) having a highest and lowest value, the actual acceleration, the minimum theoretical acceleration, and the maximum theoretical acceleration are together calculated as a function of an actual engine torque (M_mot) at the actual operating point (B_akt), and as a function of both the lower limit (UG) and the upper limit (OG) of the driving range;

determining a driver's desire (a_fwu) to perform one of accelerate and decelerate;

presetting an acceleration (a_vorg) from actual values of the minimum acceleration (a_min) and maximum acceleration (a_max) and the driver's desire (a_fwu);

calculating a ratio change per unit time (iV_pkt) of the continuously variable transmission from the acceleration (a_vorg), said ratio change per unit time is guided by the engine speed of rotation (n_mot) during the change of ratio.

2. The process according to claim 1, wherein during a change of ratio of the continuously variable transmission an engine speed of rotation upper limit value (n_Mot_grenz) is preset from which is calculated a limit value for a change of ratio per unit time (iV_pkt_grenz) which is limited upon reaching a maximum admissible variable speed.

3. The process according to claim 2, wherein the limit value for changing the ratio per unit time (iV_pkt_grenz) is model-based calculated.

4. The process according to claim 1, wherein after a transition function the acceleration (a_vorg) is converted to a theoretical acceleration (a_soll).

5. The process according to claim 4, wherein the conversion to the theoretical acceleration (a_soll) is affected in increments (inc_a_soll).

6. The process according to claim 1, wherein the change of ratio per unit time (iV_pkt) of the continuously variable transmission is model-based calculated.

7. The process according to claim 1, wherein the driver's desire (a_fwu) is determined in a function block (35) on which act input variables which represent one of an acceleration and a deceleration desire.

8. The process according to claim 7, wherein the driver's desire (a_fwu) is expressed in a percent value which is in relation to the maximum theoretical acceleration (a_max).

9. The process according to claim 1, wherein a variable speed for the ratio of the continuously variable transmission is guided so that a change in the engine speed of rotation (n_Mot) is guided according to a secondary pulley actual speed of rotation (n_S2).

10. The process according to claim 9, wherein a negative gradient of the engine speed of rotation (n_Mot) during a transition to a lower operating point following a starting operation is limited to an extent accepted by the driver.

* * * * *